US006198798B1

(12) United States Patent
Sauli

(10) Patent No.: US 6,198,798 B1
(45) Date of Patent: Mar. 6, 2001

(54) PLANISPHERICAL PARALLAX-FREE X-RAY IMAGER BASED ON THE GAS ELECTRON MULTIPLIER

(75) Inventor: Fabio Sauli, Geneva (CH)

(73) Assignee: European Organization for Nuclear Research, Geneva (CH)

( * ) Notice: Subject to any disclaimer, the term of this patent is extended or adjusted under 35 U.S.C. 154(b) by 0 days.

(21) Appl. No.: 09/150,046

(22) Filed: Sep. 9, 1998

(51) Int. Cl.[7] ................................ H05G 1/64; G01T 1/18
(52) U.S. Cl. ........................................ 378/98.2; 250/385.1
(58) Field of Search .......................... 378/98.2; 250/385.1

(56) References Cited

U.S. PATENT DOCUMENTS

| | | | |
|---|---|---|---|
| 4,317,038 | 2/1982 | Charpak . | |
| 4,595,834 | 6/1986 | Burns . | |
| 4,954,710 * | 9/1990 | Comparat et al. | 250/385.1 |
| 5,521,956 | 5/1996 | Charpak . | |
| 6,011,265 * | 1/2000 | Sauli | 250/374 |

OTHER PUBLICATIONS

Charpak et al., "The Spherical Drift Chamber for X–Ray Imaging Applications", Nuclear Instruments and Methods, Geneva—Jul. 29, 1974.

Charpak et al., "Some Properties of Spherical Drift Chambers", Nuclear Instruments and Methods, 141 (1977), pp. 449–455.

Charpak, "Parallax–Free High–Accuracy Gaseous Detectors for X–Ray and Vuv Localization", Nuclear Instruments and Methods, 201 (1982), pp, 181–192.

Rehak et al., "A Method for Reduction of Parallax Broadening in Gas–Based Position Sensitive Detectors", IEEE Transactions on Nuclear Science, vol. 44, No. 3 (1997), pp. 651–655.

* cited by examiner

*Primary Examiner*—Frank G. Font
*Assistant Examiner*—Armando Rodriguez
(74) *Attorney, Agent, or Firm*—Larson & Taylor, PLC

(57) ABSTRACT

A parallax-free X-ray imager in which a parallel X-ray beam is directed to a crystal for illuminating an entrance window is formed in a vessel filled with an ionizing gas in which primary electrons are generated. A spherical conversion volume chamber is formed by the entrance window and a first and a second parallel electrodes are adapted to generate electrical equipotential surfaces of spherical shape allowing the primary electrons to drift along corresponding radial field lines. A third electrode parallel with the second electrode is provided so as to form a gas electron multiplier structure consisting of a matrix of electric field condensing areas which are adapted to operate as an amplifier of the primary electrons through an avalanche phenomenon. A signal readout electrode is provided to allow a bi-dimensional readout in the absence of parallax readout phenomenon.

9 Claims, 6 Drawing Sheets

PLANISPHERICAL PARALLAX-FREE X-RAY IMAGER BASED ON THE GAS ELECTRON MULTIPLIER

BACKGROUND OF THE INVENTION

1. Field of the Invention

The present invention relates to a planispherical parallax-free X-ray imager more particularly adapted to industrial and/or medical application.

2. Brief Description of the Invention

Planispherical X-ray imaging devices have been up to now investigated. Most important work concerning that particular subject matter was developed by Georges CHARPAK at the EUROPEAN ORGANIZATION FOR NUCLEAR RESEARCH in Geneva (Switzerland).

A first development concerned the properties of proportional chambers with spherical drift spaces.

A proportional wire chamber equipped with a resistive divider adapted to generate appropriate spherical equipotential surfaces within the drift space of the wire chamber has been first disclosed by G. CHARPAK, Z. HAJDUK, A. JEAVONS, R. STUBBS—CERN, Geneva, Switzerland, and R. KAHN, Centre Multidisciplinaire Paris XII, av. General de Gaulle, Créteil, France, and edited by NUCLEAR INSTRUMENTS AND METHODS 307 (1974)—Geneva, Jul. 29, 1974.

A proportional wire chamber embodied as a large aperture X-ray imaging chamber equipped with a spherical drift space has been also disclosed by G. CHARPAK, C. DEMIERRE, R. KAHN, J-C. STANDIARD and F. SAULI at the CERN in Geneva. See NUCLEAR INSTRUMENTS AND METHODS 141 (1977) 449–455, North-Holland Publishing Co. A spherical drift space is disclosed as to embodying entrance and exit electrodes of spherical shape with an angular acceptance for X-rays to 90°. Coupling of spherical drift space and readout proportional chamber is disclosed to consist of a transfer space T, the lateral wall of which comprises a resistive divider adapted to generate spherical equipotential surfaces of increasing radius up to the first cathode electrode of the readout proportional chamber.

A general survey on various methods of correction for parallax errors on gaseous detectors for X-rays and UV has been published by G. CHARPAK, CERN, Geneva, Switzerland. See NUCLEAR INSTRUMENTS AND METHODS 201 (1982) 181–192, North Holland Publishing Company.

More recently, P. REHAK, G. C. SMITH and B. YU, Brookhaven National Laboratory, Uptown N.Y. 11973 presented a method for reduction of parallax broadening in gas-based position sensitive detectors at the 1996 IEEE Nuclear Science Symposium, Anaheim, Calif., Nov. 2–9, 1996 and published as IEEE Transactions on Nuclear Science, vol.44, No. 3, 1997, 651–655.

Although the drift space for photons is confined within an entrance electrode and the cathode wire plane of the readout chamber are plane and parallel, entrance window of the readout chamber is further provided with a particular conductive pattern adapted to introduce progressive bending of the equipotential surfaces, electric field lines crossing thus this equipotential surfaces at right angle, whichever the impinging direction of X-rays emanating from the focal point, so as to correct and reduce any parallax error.

In a general point of view, the above mentioned X-ray imagers may prove satisfactory to the extent that the parallax error is now reduced to a few percent. Embodying the entrance window of the readout chamber with conductive pattern adapted to provide full correction of parallax error is quite difficult to implement, since actual pattern and corresponding voltage which is to be applied to these conductive patterns are such that the electric field is approximately radial only close to the ring patterned entrance window, while it becomes substantially parallel in approaching the equipotential second electrode which defines the conversion volume. As a consequence, parallax error is thus increasing with penetration of the converting X-rays.

OBJECTS OF THE INVENTION

An object of the present invention is therefore to provide a planispherical parallax-free X-ray imager in which any image distorsion is suppressed thanks to its full symmetrical structure with respect to a symmetry axis orthogonal to an entrance window of the imager.

Another object of the invention is further to provide a planispherical parallax-free X-ray imager of very high performance that overcomes the above mentioned drawbacks of corresponding X-ray imagers of the prior art and however mechanically much simpler to implement.

SUMMARY OF THE INVENTION

More particularly, in accordance with the present invention, there is provided a planispherical parallax-free X-ray imager in which a parallel X-ray beam is directed to a crystal so as to generate a conical X-ray beam for illuminating an entrance window of the X-ray imager. The X-ray imager at least comprises a vessel containing a ionizing gas through the entrance window. The X-ray imager further comprises within the vessel, a spherical conversion volume chamber which is associated with the entrance window. The conversion volume chamber comprises a first and a second parallel electrodes adapted to generate in operation electrical equipotential surfaces of spherical shape and corresponding radial electric field lines within this spherical conversion volume chamber with these electrical equipotential surfaces of spherical shape being thus each centred at a focus common centre point substantially corresponding to the location of the crystal so as to allow any primary electron generated within the spherical conversion volume chamber to drift along the radial field lines. A third electrode substantially parallel with the second electrode is provided so as to form together a gas electron multiplier structure which comprises at least one matrix of electric field condensing areas distributed within a solid surface. Each of the electric field condensing areas is adapted to produce a local electric field amplitude enhancement proper to generate within the gas an electron avalanche from one of the primary electrons so as to allow the gas electron multiplier structure to operate as an amplifier of given gain for the primary electrons. A readout electrode is further provided with an array of elementary electrodes which is formed onto a wall of the vessel and is laid parallel to the third electrode.

The X-ray imager also comprises, outside the vessel, an electrical bias circuit which is connected to the first, second and third electrodes and thus adapted to deliver adequate voltage potentials so as to drift the primary electrons within the spherical conversion volume chamber and then multiply corresponding drifted primary electrons through an avalanche phenomenon within the gas electron multiplier structure. A detection circuit is further provided and connected to the readout electrode so as to allow a bi-dimensional readout of the position of any generated avalanche phenomenon thanks to the gas electron multiplier structure in the absence of a substantial parallax readout phenomenon.

The objects, advantages and other particular features of the parallax-free X-ray imager of the invention will become more apparent upon reading of the subsequent non restrictive description of the preferred embodiments thereof which are given by way of example only with reference to the accompanying drawings.

DETAILED DESCRIPTION OF THE PREFERRED EMBODIMENTS

The parallax-free X-ray imager according to the invention is now disclosed as a non limitative example in the present specification.

Particularly, it should be kept in mind that the planispherical parallax-free X-ray imager in accordance with the invention can be used with specific advantages in various types of applications such as imaging of the diffraction patterns of X-rays diffused from a crystal used for proteins structural analysis and genome characterization, low dose absorption radiography for medical diagnosis for mammography, industrial absorptive and back-scattering radiography with X-rays, and focused imaging of specific regions within a body with blurring of the photons emitted from surrounding materials.

More particularly, any kind of radiations which come to effect to release primary electrons in gas with these radiations emanating as a conical X-ray beam illuminating an entrance window can thus be detected thanks to the planispherical parallax-free X-ray imager of the invention.

Figure 1A:
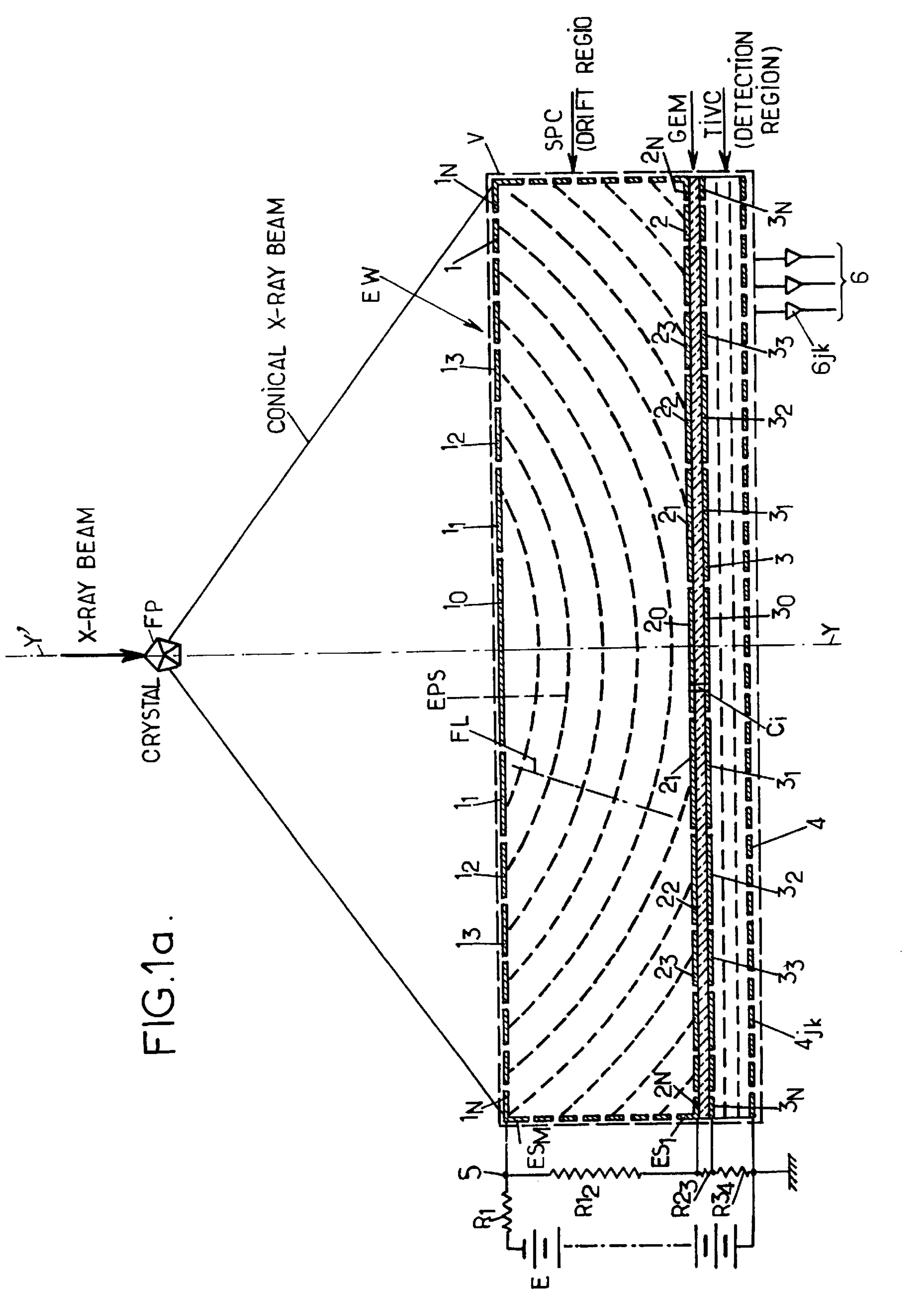
FIG. 1a is a section view of a preferred embodiment of a parallax-free X-ray imager in accordance with the present invention.
Figure 1B:
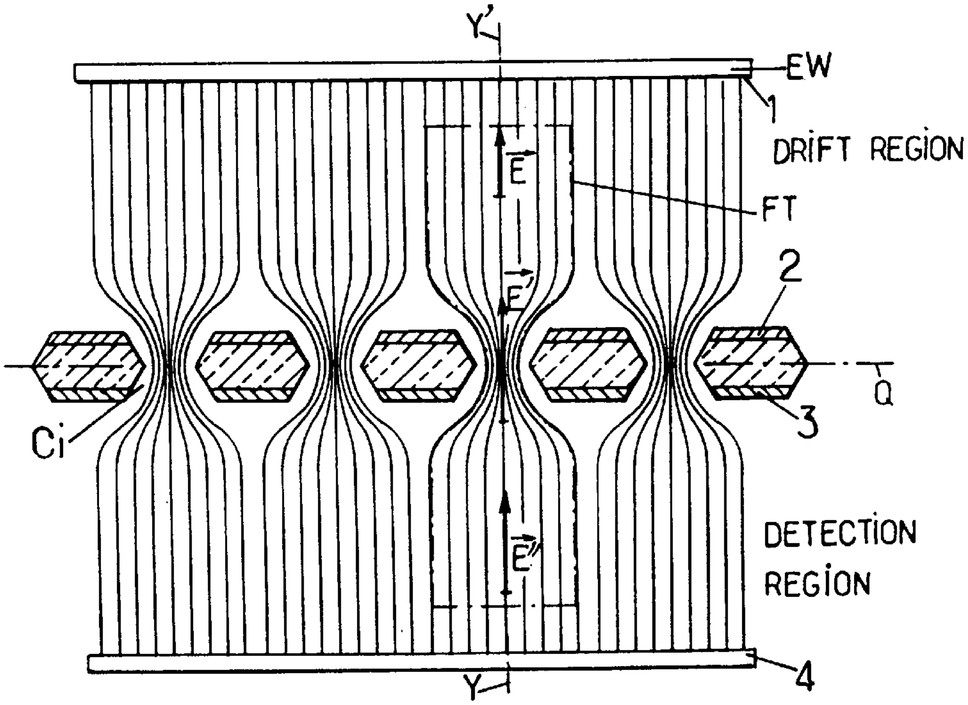
FIG. 1b is a section view of a gas electron multiplier structure integrated within the parallax-free X-ray imager of the invention particularly adapted to operate as an amplifier of given gain for primary electrons generated within the spherical conversion volume chamber, amplification of these primary electrons taking place through an avalanche phenomenon.
Figure 1C:
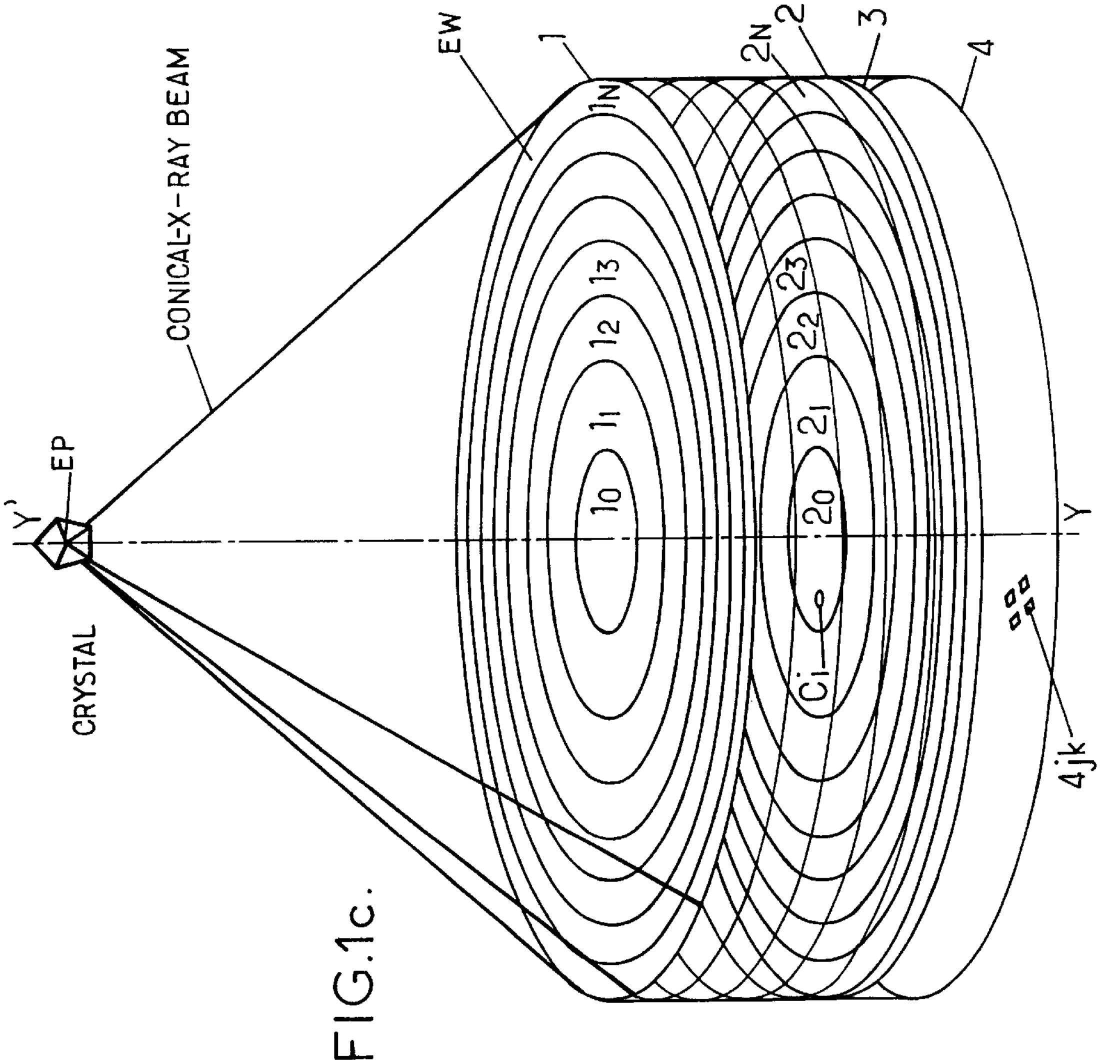
FIG. 1c is a partial perspective view of FIG. 1a in which the mechanical structure of the entrance window and the gas electron multiplier structure and their relative position adapted to embodying the parallax-free X-ray imager in accordance with the present invention is represented.

The planispherical parallax-free X-ray imager in accordance with the invention is thus disclosed with reference to FIGS. 1a, 1b and 1c.

In the accompanying drawings, the same references designate the same elements while relative dimensions of these elements are not represented for the sake of better comprehension of the whole.

FIG. 1a shows a section view of the planispherical parallax-free X-ray imager of the invention, this section view being thus represented within a symmetry plane corresponding to the plane of FIG. 1a. The parallax-free X-ray imager of the invention is more preferably embodied as cylindrical in shape, this symmetry plane corresponding thus to a radial symmetry plane of this cylinder, as it will be disclosed in more detail later in the specification.

As shown at FIG. 1a, the planispherical parallaxfree X-ray imager of the invention is used with a parallel X-ray beam which is directed to a crystal so as to generate a conical X-ray beam for illuminating an entrance window, referred to as EW, of the X-ray imager. As further shown at FIG. 1a, the X-ray imager of the invention comprises a vessel V containing a ionizing gas for generating primary electrons under impingement of the X-ray beam and particularly the conical X-ray beam, as further mentioned in the specification, within the ionizing gas through the entrance window EW. As previously mentioned in the specification, the vessel V is cylindrical in shape with its entrance window EW being thus circular, plane and oriented towards the impinging conical X-ray beam.

The X-ray imager of the invention as shown at FIG. la further comprises within the vessel V a spherical conversion volume chamber, referred to as SPC, which is associated with the entrance window EW. This conversion volume chamber SPC comprises a first 1 and a second 2 parallel electrodes which are adapted to generate in operation electrical equipotential surfaces of spherical shape and corresponding radial electric field lines FL within this spherical conversion volume chamber SPC.

As a consequence, according to one feature of highest interest of the parallax-free X-ray imager of the invention, the conversion volume chamber SPC fully operates as a spherical conversion volume chamber, since its equipotential surfaces are spherical in shape while it has a full planar or rectangular structure only. It should thus be born in mind that while such a rectangular or planar structure is quite easy to implement a fine control of the spherical equipotential surfaces shapes can thus be performed through adequate voltage potentials applied to the electrodes embodying such rectangular or planar structure as will be explained later in the specification.

According to one essential feature of the parallax-free X-ray imager in accordance with the invention, the electrical equipotential surfaces are each centred at a focus common centred point, referred to as FP, which in operation substantially corresponds to the location of the crystal in order to allow any primary electrons generated within the spherical conversion volume chamber SPC to drift along the radial field lines.

In FIG. 1a, one radial field line only is represented with this field line being fully orthogonal to the spherical electrical equipotential surfaces which are represented in dotted lines within the conversion volume chamber SPC. The field line is referred to as FL at FIG. 1a.

Further to the first 1 and second 2 electrodes, the vessel embodying the parallax-free X-ray imager in accordance with the invention further comprises a third electrode 3 which is substantially parallel with the second electrode 2 with these second 2 and third 3 electrodes forming thus a gas electron multiplier structure, referred to as GEM, which is adapted to thus operate as an amplifier of given gain for the primary electrons.

In a general sense, the gas electron multiplier structure GEM comprises one matrix of electric field condensing areas, referred to as $C_i$. These electrical field condensing areas $C_i$ are thus distributed within a solid surface with this solid surface being delimited by the above mentioned second 2 and third 3 electrodes contained within the vessel V.

As shown in more detail at FIG. 1*b*, the above mentioned solid surface may be thus embodied through a printed circuit board and preferably may consist of a thin insulator foil which is metal clad on each of its faces, the metal cladding being thus referred to as 2 and 3 so as to embody the second 2 and third 3 electrodes contained within the vessel. The sandwich structure thus formed is further traversed by a regularly matrix of tiny holes, referred to as $C_i$ at FIG. 1*b*. Typical values are 25 to 50 $\mu$m of thickness for the foil with the centre of the tiny holes being thus separated at a distance comprised between 50 and 300 $\mu$m. The tiny holes may well have a diameter which is comprised between 20 and 100 $\mu$m. The matrix of tiny holes is generally formed in all or most of the area of an insulator foil of regular shape. The insulator foil is thus provided with electrodes on each of its faces, these electrodes being thus adapted so as to form the second 2 and third 3 electrodes and to apply a potential difference between the metal sides of the mesh embodying thus the matrix of tiny holes.

The composite mesh can thus be manufactured with conventional technologies which as such are not disclosed in the present specification, and appear simple to install rigid and resistant to accidental discharges.

The mesh embodying the matrix of tiny holes can be thus released by conventional printed circuit technology. A proper way to embody the matrix of tiny holes is disclosed in U.S. patent application Ser. No. 08/956,128 filed by Fabio SAULI et al. on Oct. 22, 1997 and which is incorporated in the present specification by reference.

The structure of the matrix of tiny holes, dimension and shapes of the holes, type of gas or gas mixture and corresponding mode of operation of the GEM structure as disclosed in the specification of the above mentioned U.S. patent application Ser. No. 08/956,128 are thus incorporated by reference to illustrate corresponding embodiment of the matrix of tiny holes embodying the GEM structure of the parallax-free X-ray imager of the invention.

The second 2 and third 3 electrodes are thus adapted to be set at a convenient voltage potential, i.e. a continuous voltage potential difference value so as to form at the level of each of the tiny holes forming the matrix of tiny holes within this solid surface to form a corresponding electric field condensing area $C_i$. It should be thus understood that each tiny hole or through hole traversing the sandwich structure behaves thus as a dipole which in fact superimposes a further electric field vector $\vec{E}'$ with this further electric field being substantially directed along a symmetry axis of each tiny hole.

As a consequence, each of the electric field condensing area is thus adapted to produce a local electric field amplitude enhancement, referred to $\vec{E}'$, which is proper to generate within the gas an electron avalanche from the primary electrons generated within the spherical conversion volume, referred to as SPC, under impingement of one ray of the conical X-ray beam.

For the sake of clarity and better comprehension, FIG. 1*b* is shown in the absence of electric charges within the drift region, i.e. the spherical conversion volume SPC, and the transfer and induction volume, referred to as TIVC, which corresponds to a detection region, this case fully corresponding as an example to the absence of ionizing radiations. With reference to FIG. 1*b*, any virtual solid surface, thereafter designated as FT, which is delimited by the outermost electric field lines reaching one local electric field condensing area as shown at FIG. 1*a* for example, delineates thus an electric field tube FT in which the electric field flux presents a preservative character. As a consequence, it is clear to any person of ordinary skill in the corresponding art that the enhancement of the electric field at the level of each local electric field condensing area $C_i$ is thus given accordingly with any surface being passed through by the condensing electric field vector $\vec{E}'$ being in direct relation to the enhancement for the resulting electric field which is thus equal to the sum of original electric field vector $\vec{E}$ and superimposed electric field vector $\vec{E}'$.

It is further emphasized that the sandwich structure embodying the matrix of electric field condensing areas $C_i$ is of symmetrical character with respect to a symmetry plane, referred to as plane Q at FIG. 1*b*. As a consequence, any virtual solid surface formed by the outermost electric field lines reaching a corresponding local electric field condensing area $C_i$ is substantially transferred as a symmetrical virtual solid surface formed by the electric field line leaving the same local electric field condensing area $C_i$ in the detection region, as shown at FIG. 1*a* with respect to the same electric field tube FT.

As further shown at FIG. 1*a*, the parallax-free X-ray imager in accordance with the present invention is further provided within the vessel V with a signal readout electrode 4 preferably formed onto a wall of the vessel V and which is parallel to the third electrode 3. The signal readout electrode 4 may for example consist of elementary electrodes, referred to as $\mathbf{4}_{jk}$, each elementary electrode consisting for example of parallel conductive strips or pads in case bidimensional readout is performed.

In a general sense, the readout electrode 4 and corresponding elementary electrodes $\mathbf{4}_{jk}$ form a transfer and induction volume, referred to as TIVC, with the third electrode 3. This transfer and induction volume chamber TIVC fully corresponds to a detection region as previously mentioned with reference to FIG. 1*b*. For this reason, the electrical equipotential surfaces of the transfer and induction volume chamber TIVC are represented parallel to the signal readout electrode 4 as shown at FIG. 1*a*. As it will be disclosed in more details in the specification, electrical equipotential surfaces of the TIVC chamber may even be slightly bent through appropriate electrodes in order to have a full transfer of the avalanche phenomenons which are generated within each electric field condensing areas $C_i$ in the absence of any substantial parallax error.

As further shown at FIG. 1*a*, the planispherical parallax-free X-ray imager in accordance with the present invention is further provided, outside the vessel V, with electrical bias means 5 which are connected to the first 1, the second 2 and the third 3 electrodes and which are adapted to deliver adequate voltage potentials so as to drift the primary electrons within the spherical conversion volume chamber SPC, multiply corresponding drifted primary electrons through the above mentioned avalanche phenomenon within the gas electron multiplier structure GEM and then transfer this avalanche phenomenon within the TIVC chamber up to the signal readout electrode 4 in proper conditions. For the sake of comprehension, the electrical bias circuit 5 is represented in a conventional manner at FIG. 1*a* as a D.C. or voltage source feeding an adequate resistor adapted to deliver necessary potentials to the first 1, the second 2 and the third 3 electrodes as known in a conventional manner. It should be born in mind that the signal readout electrode 4, or in other words the elementary electrodes $4_{jk}$ embodying the latter, are put at the reference potential with the difference voltage potential applied to the third, the second and the first electrodes being thus decreasing negative potentials.

Further to the electrical bias circuit 5, detection circuits 6 are provided outside the vessel V and connected to the readout electrode 4. The detection circuits 6 may consist of elementary proportional amplifiers $6_{jk}$, each connected to one of the elementary electrode embodying the signal readout electrode 4 in a well-known manner. In case the elementary electrodes associated with their own elementary operational amplifier are provided, the position of any generated avalanche phenomenon can be thus readout in a bidimensional readout thanks to the index j and k which are allotted to each elementary electrode and associated operational amplifier.

As further shown at FIG. 1*a*, the first 1, second 2 and third 3 electrodes are each provided with electrical conductive field rings or surfaces which are engraved onto these electrodes. The electrical conductive field rings of first electrode 1 are referred to as $1_0$ to $1_N$, those of electrode 2 are referred to as $2_0$ to $2_N$ and those of electrode 3 are referred to as $3_0$ to $3_N$. These electrical conductive field rings have a common centre, referred to as $1_0$, $2_0$ and $3_0$ respectively and are each distributed over the external surface of their corresponding electrodes.

A general perspective view of the parallax-free X-ray imager of the invention is shown at FIG. 1*c* for a vessel V which is cylindrical in shape. In such a case, the entrance window EW, the first 1, second 2 and third 3 and readout 4 electrodes are shaped as a disk with each of this disks being thus joined together thanks to a lateral curve surface so as to form the cylindrical vessel V. As shown in more detail in connection with FIG. 1*c*, the common centre $1_0$, $2_0$ and $3_0$ of first 1, second 2 and third 3 electrodes may thus consist of a single disk of conductive material while the rings of upper rank have their own common centre and are each distributed over the external surface of the corresponding electrode.

Figure 1D:
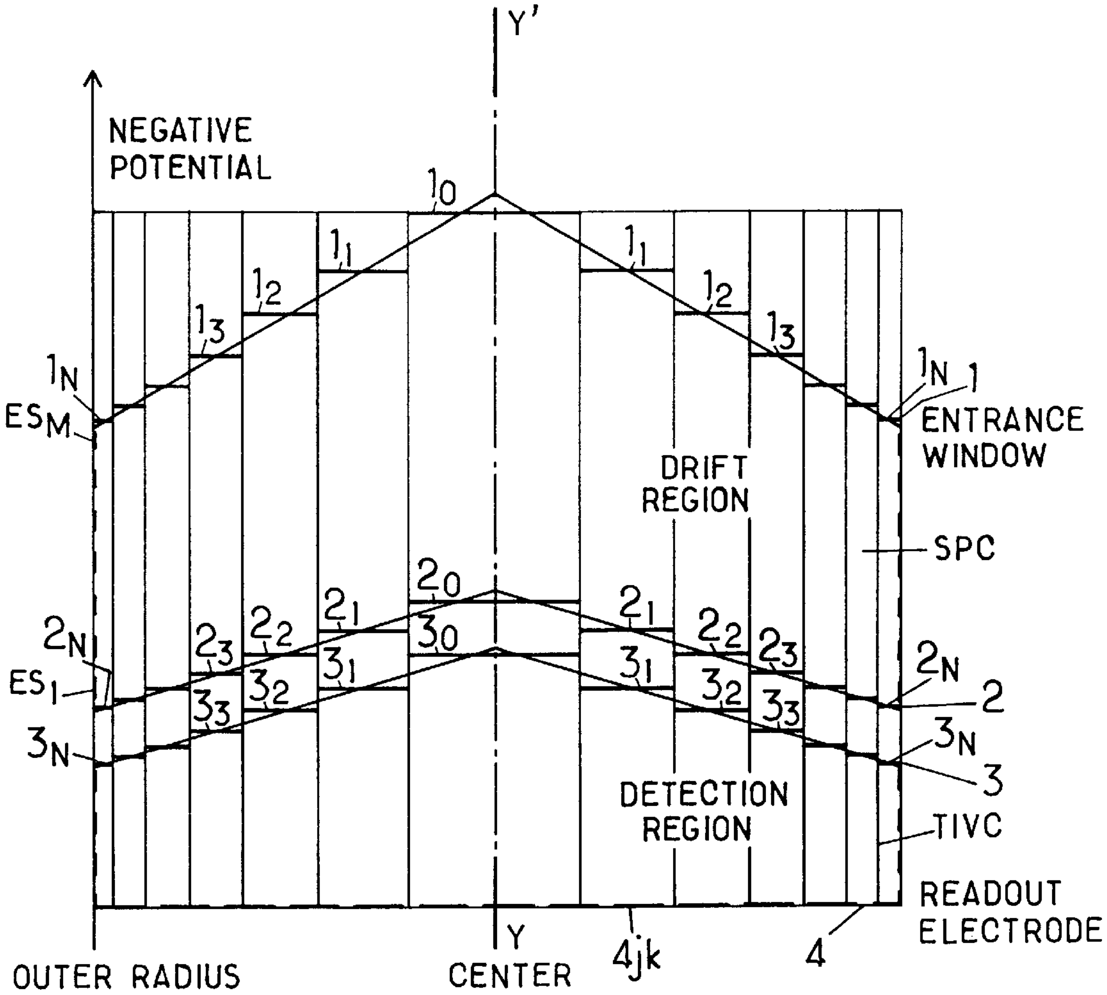
FIG. 1d is a voltage potential distribution representation of the voltage potentials which are successively applied to the electrodes forming the entrance window and the gas electron multiplier structure embodying the parallax-free X-ray imager in accordance of the present invention.

As shown in more details in connection with FIGS. 1*a*, 1*c* and 1*d*, the second 2 and third 3 electrodes are each provided with concentric electrical field rings which are spaced apart from one another on one face of its corresponding electrode by a circular grove, one grove and one electrical field ring of same rank of the second electrode 2 facing one corresponding grove and electric conductive field ring of same rank of the third electrode 3 so as to allow, on the one hand, the electrical conductive field rings of the second electrode 2, when these are set at an adequate electrical potential, to define corresponding limit electrical potential values for the electrical equipotential surfaces in a direction which is parallel to the surface of the second electrode 2 and, on the other hand, to allow the second 2 and the third 3 electrodes to perform the gas electrode multiplier function in the absence of any substantial distortion.

More particularly, it will thus be understood that the same ring pattern is realised on both sides of the gas electron multiplier structure by second etching the foils after implementation of the matrix of tiny holes for example, as described in the above mentioned US Patent Application incorporated within the present specification by reference. A fine segmentation is thus performed allowing thus the local difference of potential within second electrode 2 and third electrode 3 embodying the gas electron multiplier structure to remain roughly constant and thus ensure a good gain uniformity.

As a matter of fact, the lateral curved surfaces joining the first and second electrodes or even the third and the signal readout electrode 4 are further provided with edge-shaping electrodes, referred to as $ES_1$ to $ES^N$. The first 1, second 2 and corresponding lateral curved surface and edge-shaping electrodes $ES_1$ to $ES_N$ form thus the spherical conversion volume chamber SPC, with the edge-shaping electrodes $ES_1$ to $ES_N$ being set at an adequate electrical potential so as to generate adapted limit electrical potential values for the electrical equipotential surfaces of spherical shape, as shown at FIG. 1*a*. The same corresponding feature can be provided at the level of the TIVC chamber so as to give to the electrical potential surfaces or the TIVC chamber a slight bend, as it will be disclosed in more detail later in the specification.

As shown in more details at FIG. 1*d*, the signal readout electrode 4 is set in operation at a reference potential while the central electrical conductive ring of the third, second and first electrodes, referred to as $3_0$, $2_0$, $1_0$ respectively, are set at relative decreasing bias electrical potential with respect to the reference potential. Accordingly, each of the electrical conductive ring belonging to one of the third 3, second 2 and first 1 electrodes are further set to successive increasing bias electrical potential with respect to the corresponding bias electrical potential of its corresponding central electrical conductive ring $3_0$, $2_0$, $1_0$ respectively, thanks to the electrical bias means 5.

As a consequence, the potential gradient between two electrical conductive rings facing each other onto these second 2 and three electrode 3 have substantially the same value between conjugate rings $2_0$, $3_0$ to $2_N$, $3_N$, these gradients of same value generating thus a substantially same amplifying electric field $\vec{E}'$ within the whole gas electron multiplier structure GEM.

As further shown at FIG. 1*a*, the electrical bias circuits 5 may be provided with adjustable bias voltage potential device, feeding resistors referred to as $R_{12}$, $R_{23}$ and $R_{34}$, this device being adapted to deliver a bias voltage potential of adjusted value within a given voltage range value which is applied to the first and second electrodes 1, 2, so as to vary the focus location along the symmetry axis shown at FIG. 1*a*. Operating the adjustable bias voltage potential device, or even adjusting one or several of the resistors values, allows thus to dynamically vary the focal length in a given range by adjusting externally the voltage potentials which are applied to the main nodes and then to the conductive rings.

Figure 2C:
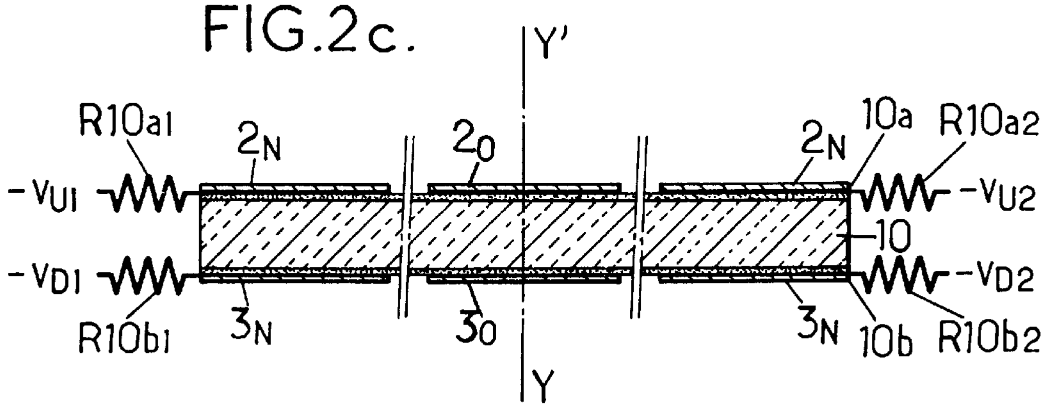
FIG. 2c is a section view of a gas electron multiplier structure integrated within the parallax-free X-ray imager of the invention more particularly adapted to allow a proper electrical voltage potential feeding of the successive conductive rings in the absence of substantial degradation of the image through masking of the feeding connecting lines.
Figure 2A:
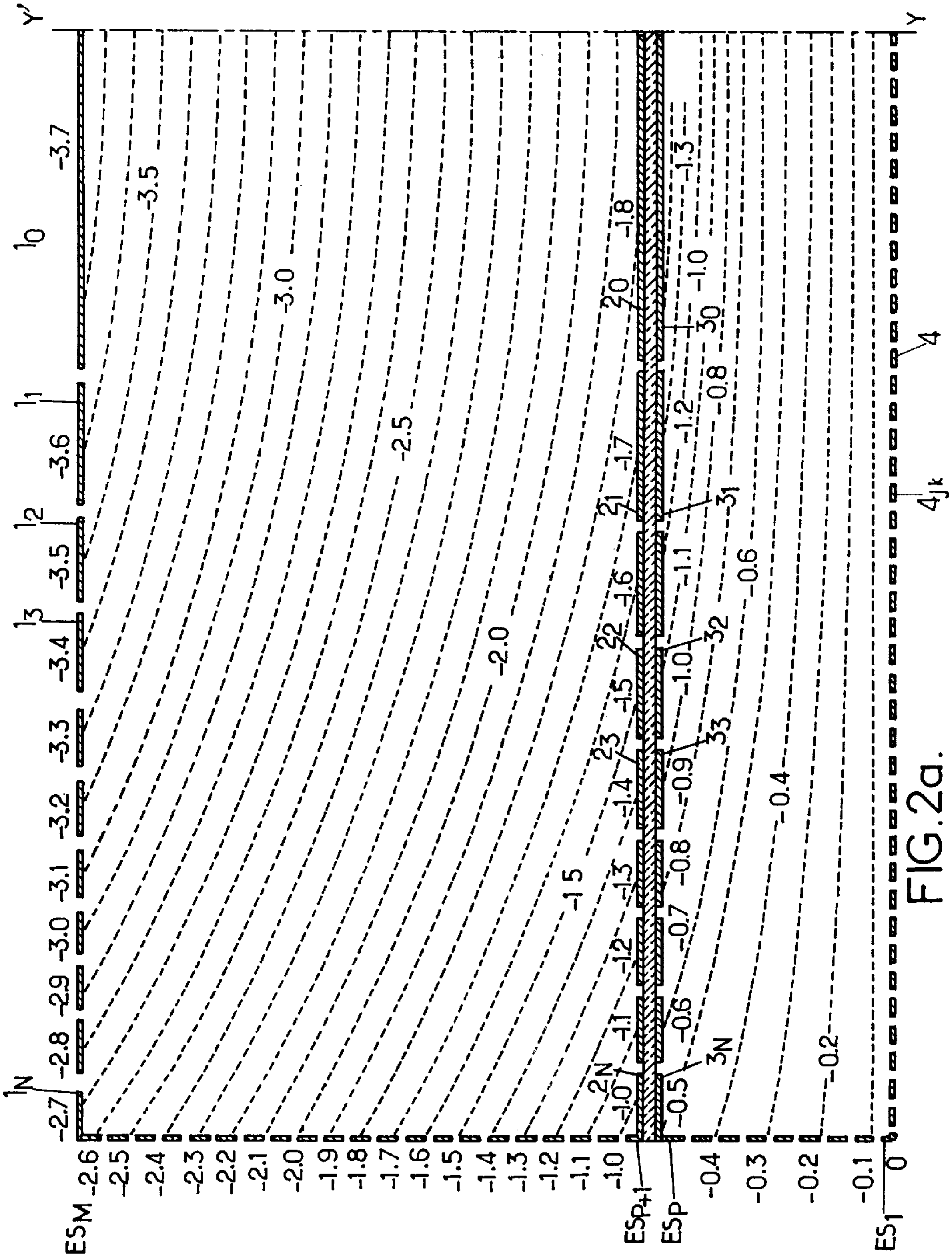
FIG. 2a is a partial section view of the spherical conversion volume chamber, the gas electron multiplier structure and transfer and induction volume embodying the parallax-free X-ray imager of the invention in which relative voltage potential values applied to corresponding electrodes and corresponding electrical equipotential surfaces are shown.

A full representation of the electrical equipotential surfaces of spherical shape within the spherical conversion volume chamber SPC and corresponding electrical equipotential surfaces within the TIVC chamber, or in other words within the drift region and the detection region respectively, is shown at FIG. 2*a* for given electrical potential values applied to the successive rings forming the first 1, second 2 and third 3 electrodes and corresponding edge-shaping electrodes $ES_1$ to $ES_M$ of the above mentioned chambers.

At FIG. 2*a*, half part of these chambers are shown, i.e. the left part as referred to at FIG. 1*a* with respect to the symmetry axis.

Potential values are indicated in kV as an example only.

In order to have the electrical equipotential surfaces of the TIVC chamber slightly bent as shown at FIG. 2*a*, given steps of voltage potentials to 100 volts may be spread along the edge-shaping electrodes referred to as $ES_1$ to $ES_P$ as shown at FIG. 2*a*.

The most external conductive ring, referred to as $\mathbf{3}_N$, of electrode 3, is thus preferably set at a voltage potential decreased of one voltage's step with respect to the last shaping-electrode $ES_P$ while successive inner rings are set at voltage potentials which are decreased by the same voltage's step, i.e. 100 volts, with the central ring $\mathbf{3}_0$ being set at −1.3 kV.

Corresponding conjugate conductive rings are set with reference to FIG. 1*d* at corresponding potentials so as to generate the same voltage gradient between conjugate rings $\mathbf{2}_0$, $\mathbf{3}_0$ to $\mathbf{2}_N$, $\mathbf{3}_N$. The most external conductive ring $\mathbf{2}_N$ is thus put at a voltage potential to −1.0 kV as shown at FIG. 2*a*. Successive edge-shaping electrodes, referred to as $ES_{P+1}$ to ESM which are distributed over the lateral surface of the spherical conversion volume SPC, as shown at FIG. 2*a*, are set at successive step potentials of 100 volts with the last edge-shaping electrode referred to as $ES_M$ being thus put to −2.6 kV.

Successive conductive rings of the first electrode 1 from the outermost conductive ring $\mathbf{1}_N$ are thus set at stepped potentials decreasing from corresponding step value with respect to last potential value applied to the last edge-shaping electrode $ES_M$, central conductive disk $\mathbf{1}_0$ being thus put to the most negative voltage potential to −3.7 kV.

As shown at FIG. 2*a*, it is thus emphasized that applying successive decreasing step voltages to the edgeshaping electrodes $ES_1$ to $ES_P$, then to conjugate conductive rings $\mathbf{3}_N$, $\mathbf{2}_N$ to $\mathbf{3}_0$, $\mathbf{2}_0$ and then to edge-shaping electrode $ES_{P+1}$ to $ES_M$ and successive conductive rings of the first electrode $\mathbf{1}_N$ to $\mathbf{1}_0$ allows thus to generate voltage equipotential surfaces of spherical shape within the drift region of the spherical conversion volume chamber SPC and then to transform these electrical equipotential surfaces to slightly bent equipotential surfaces which are then modified to planar electrical equipotential surfaces in the vicinity of the readout electrode 4 without introducing any substantial distortion of the image read on this readout electrode.

Figure 2B:
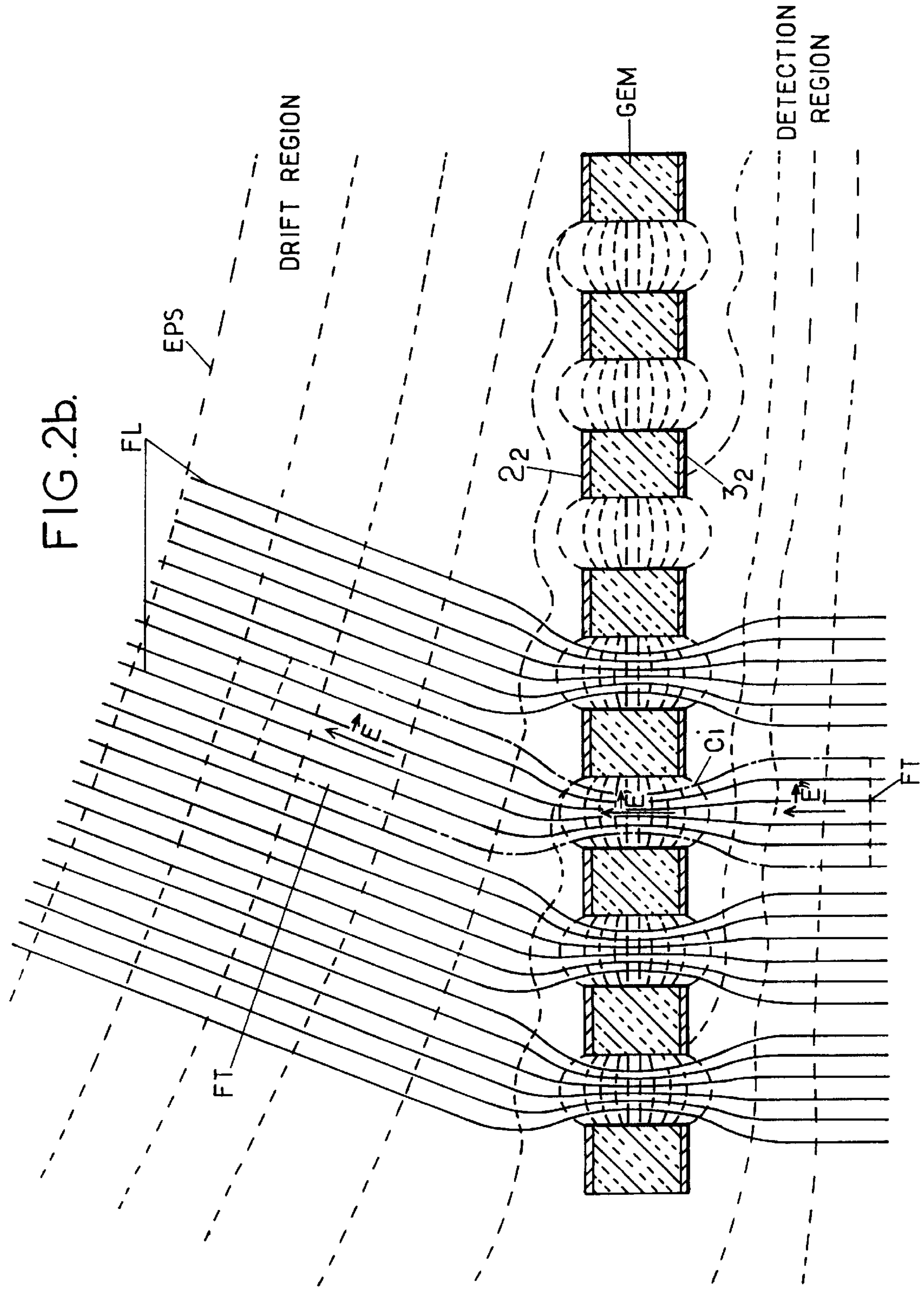
FIG. 2b is a detail of FIG. 2a in which local deformations of the electrical equipotential surfaces and corresponding electric field lines in the vicinity of the electric field condensing areas forming the gas electron multiplier structure are shown for better comprehension.

A representation of the electrical equipotential surface, referred to as EPS, and the field lines, referred to as FL, in the vicinity of the electrical field condensing area $C_i$ of two conjugate conductive rings, for example conductive ring $\mathbf{3}_2$ of electrode 3 and conductive ring $\mathbf{2}_2$ of electrode 2, is now disclosed with reference to FIG. 2*b*.

As a matter of fact, FIG. 2*b* fully corresponds to FIG. 1*b* in which the electrical equipotential surfaces are bent in the drift region, as shown for example at FIG. 2*a*, while corresponding electrical equipotential surfaces of the detection region are also slightly bent to correspond to those of the TIVC chamber in the detection region.

As shown at FIG. 2*b*, the electrical equipotential surfaces EPS are slightly bent and distorted in the vicinity of each electrical field condensing area $C_i$ only. As a consequence, any corresponding field lines FL is thus submitted to a local distortion only while each of them is maintained in orthogonal relationship to the distorted electrical equipotential surface EPS. Consequently, any field tube FT is preserved, in the same manner as in FIG. 1*b*, as shown at FIG. 2*b*, in the absence of any substantial distortion of the image introduced by the transfer of the electrons from the drift region to the detection region after amplification through avalanche phenomenon.

Adequate electric potential bias voltages feeding the successive conductive rings $\mathbf{2}_0$ to $\mathbf{2}_N$ and $\mathbf{3}_0$ to $\mathbf{3}_N$ may thus take place either by direct feeding of the appropriate voltage potentials to each conductive ring from an external resistive partition network, using insulating conductors, or thanks to surface mount resistors of appropriate values directly soldered and thus connected between adjacent rings, while feeding adequate voltage potentials to the central rings $\mathbf{2}_0$ and $\mathbf{3}_0$ through single insulated conductors.

A sectional view of the GEM structure is shown at FIG. 2*c* in a preferred embodiment in which a special sandwich structure has been developed to allow a proper electrical voltage potential feeding of the conductive rings in the absence of a substantial degradation of the image through masking introduced by the feeding connecting lines. As shown at FIG. 2*c*, the sandwich structure consists of the second electrode 2 and its rings $\mathbf{2}_0$ to $\mathbf{2}_N$, a resistive layer 10*a* covering the insulator foil 10 and a further resistive layer $\mathbf{10}_b$ and the third electrode 3 and its rings $\mathbf{3}_0$ to $\mathbf{3}_N$. The whole structure is traversed by tiny holes embodying the electric field condensing areas, which are not shown at FIG. 2*c*. Connecting each resistive layer $\mathbf{10}_a$, $\mathbf{10}_b$ through adequate resistors $R_{10a1}$, $R_{10a2}$ and $R_{10b1}$, $R_{10b2}$ to adapted voltage potential values $-VU_1$, $-VU_2$ and $-VD_1$, $-VD_2$ respectively allow thus to put corresponding conductive rings to adaptive voltage potential values, as shown in FIG. 2*a*, while smoothing the electric field transition from one ring to the adjacent one, the voltage gradient between two conjugate rings being preserved and, as a consequence, the GEM structure amplification factor or gain over the whole surface of the latter.

What is claimed is:

1. A parallax-free X-ray imager in which a parallel X-ray beam is directed to a crystal so as to generate a conical X-ray beam for illuminating an entrance window of said X-ray imager, said X-ray imager comprising a vessel containing an ionizing gas for generating primary electrons in response to impingement of said conical X-ray beam within said ionizing gas through said entrance window, said X-ray imager further comprising, within said vessel:

a spherical conversion volume chamber associated with said entrance window, said conversion volume chamber comprising first and second parallel electrodes for generating, in operations electrical equipotential surfaces of spherical shape and corresponding radial electric field lines within said spherical conversion volume chamber, said electrical equipotential surfaces of spherical shape being each centered at a common center focal point substantially corresponding to the location of the crystal so as to allow any primary electron generated within said spherical conversion volume chamber to drift substantially along said radial field lines;

a third electrode disposed substantially parallel to said second electrode and forming therewith a gas electron multiplier structure, said gas electron multiplier structure comprising at least one matrix of electric field condensing areas, distributed within a solid surface, for generating a local electric field amplitude enhancement sufficient to generate in said gas an electron avalanche from one of said primary electrons, and said gas electron multiplier thereby operating as an amplifier of given gain for said primary electrons; and a signal readout electrode comprising an array of elementary electrodes, said signal readout electrode being disposed on a wall of said vessel in parallel with said third electrode;

and further comprising, outside of said vessel:

electrical bias means, connected to said first, second and third electrodes, for supplying voltage potentials sufficient to provide drift of said primary electrons within said spherical conversion volume chamber and to multiply corresponding drifted primary electrons through said avalanche phenomenon within said gas electron multiplier structure; and detection means, connected to said readout electrode, for providing a bi-dimensional readout of the position of any generated avalanche phenomenon provided by said gas electron multiplier structure without substantial parallax.

2. The parallax-free X-ray imager of claim 1, wherein said first, second and third electrodes are each provided with electrical conductive field rings engraved onto said electrodes, said electrical conductive field rings having a common center and being each distributed over the external surface of said electrodes.

3. The parallax-free X-ray imager of claim 1 wherein said second and third electrodes are each provided with concentric electrical conductive field rings spaced apart from one another on one face of said electrodes by a circular groove, one groove and one electrical conductive field ring of said second electrode facing one corresponding groove and electrical conductive field ring of said third electrode so as to allow, on the one hand, said electrical conductive field rings of said second electrode when set at an a sufficient electrical potential to define corresponding limit electrical potential limit for said electrical equipotential surfaces in a direction parallel to the surface of said second electrode and, on the other hand, said second and third electrodes to perform said gas electron multiplier function in the absence of any substantial distortion.

4. The parallax-free X-ray imager of claim 1, wherein said vessel is cylindrical in shape, and said entrance window, first, second, third and readout electrodes each comprise a disk, each of said disks thus joined together by a lateral curved surface so as to form said cylindrical vessel.

5. The parallax-free X-ray imager of claim 4, wherein said lateral curved surface joining said first and second electrodes is further provided with edge shaping electrodes, such that said first and second electrodes, corresponding lateral curved surface and edge shaping electrodes thereby form said spherical conversion volume chamber, said edge shaping electrodes being supplied with a sufficient electrical potential to generate adapted electrical potential limit values for said electrical equipotential surfaces of spherical shape.

6. The parallax-free X-ray imager of claim 1, wherein said electrical conductive rings of said first, second and third electrodes spread from a central electrical conductive ring over the surface of the corresponding electrode, and said readout electrode, in operation, having supplied thereto a reference potential, the central electrical conductive ring of said third, second and first electrodes being supplied with relative decreasing electrical bias potentials with respect to said reference potential, each said electrical conductive ring of said third, second and first electrodes being further supplied with a electrical bias potential of a successively increasing value with respect to the corresponding electrical bias potential of the corresponding central electrical conductive ring.

7. The parallax-free X-ray imager of claim 6, wherein the potential gradient between two electrical conductive rings facing each other onto said second and third electrodes has substantially the same value so as to generate a substantially same amplifying electric field within the whole gas electron multiplier structure.

8. The parallax-free X-ray imager of claim 1, wherein said electrical bias means comprise adjustable bias voltage potential means adapted to deliver a bias voltage potential of adjusted value within a given voltage range value, said bias voltage potential value being applied to said first and second electrodes so as to vary the focus location along an axis orthogonal to said entrance window.

9. The parallax-free imager of claim 1, wherein said gas electron multiplier structure is made of a sandwich structure, said sandwich structure comprising a first conductive layer and associated conductive rings forming said second electrode;

a first resistive layer;

an insulating foil;

a second resistive layer; and a second conductive layer and associated rings forming said third electrode, said first and second resistive layers allowing said rings to be supplied with bias potential voltages adapted to maintain a substantially constant voltage gradient over the whole surface of the gas electron multiplier structure.

* * * * *